(12) United States Patent
Kim et al.

(10) Patent No.: US 11,476,895 B2
(45) Date of Patent: Oct. 18, 2022

(54) EXTERNAL DEVICE INCLUDING AT LEAST ONE ANTENNA, AND ELECTRONIC DEVICE AND METHOD FOR IMPROVING ANTENNA PERFORMANCE USING SAME

(71) Applicant: SAMSUNG ELECTRONICS CO., LTD., Suwon-si (KR)

(72) Inventors: Geonwoo Kim, Suwon-si (KR); Youngil Nam, Suwon-si (KR); Wonho Lee, Suwon-si (KR); Sungjae Cho, Suwon-si (KR); Kyuhui Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/893,770

(22) Filed: Jun. 5, 2020

(65) Prior Publication Data

US 2020/0389208 A1 Dec. 10, 2020

(30) Foreign Application Priority Data

Jun. 5, 2019 (KR) .................. 10-2019-0066692

(51) Int. Cl.
*H04B 5/00* (2006.01)
*H04W 12/06* (2021.01)
*H04W 4/80* (2018.01)

(52) U.S. Cl.
CPC ......... *H04B 5/0031* (2013.01); *H04B 5/0056* (2013.01); *H04B 5/0081* (2013.01); *H04W 4/80* (2018.02); *H04W 12/06* (2013.01)

(58) Field of Classification Search
CPC .. H04B 5/0031; H04B 5/0081; H04B 5/0056; H04W 12/06; H04W 4/80; H04M 1/724;
(Continued)

(56) References Cited

U.S. PATENT DOCUMENTS 8,688,043 B2 4/2014 Lewin
2011/0070828 A1 3/2011 Griffin et al.
(Continued)

FOREIGN PATENT DOCUMENTS

KR 10-2007-0116375 12/2007
KR 10-2008-0106734 A 12/2008
(Continued)

OTHER PUBLICATIONS

Search Report and Written Opinion dated Sep. 28, 2020 in counterpart International Patent Application No. PCT/KR2020/007356.

*Primary Examiner* — Eugene Yun
(74) *Attorney, Agent, or Firm* — Nixon & Vanderhye P.C.

(57) ABSTRACT

An electronic device according to various embodiments may include: a housing; a communication module comprising circuitry coupled to at least one surface of the housing configured to be connected to an external device including multiple near field communication (NFC) antennas; and a processor, wherein the processor may be configured to: obtain device information of the external device from the external device based on the external device being coupled; generate antenna setting information for setting the multiple NFC antennas of the external device based on at least one of the device information of the external device and device information of the electronic device; and control the electronic device to transmit the generated antenna setting information to control the setting of the multiple NFC antennas.

12 Claims, 10 Drawing Sheets

(58) Field of Classification Search
CPC ......... H04M 2201/34; H04M 2201/36; H04M 2201/38; H04M 2250/04
USPC ....................................................... 455/41.1
See application file for complete search history.

(56) References Cited

U.S. PATENT DOCUMENTS

| | | | |
|---|---|---|---|
| 2014/0285033 A1* | 9/2014 | Jantunen | H04M 1/7246 307/149 |
| 2014/0364068 A1 | 12/2014 | Maguire | |
| 2016/0049993 A1 | 2/2016 | McCoy et al. | |
| 2016/0064803 A1 | 3/2016 | Shi | |
| 2019/0372385 A1* | 12/2019 | Cheikh | H02J 50/20 |

FOREIGN PATENT DOCUMENTS

| | | |
|---|---|---|
| KR | 10-2017-0138383 | 12/2014 |
| KR | 10-1710822 | 2/2017 |

* cited by examiner

EXTERNAL DEVICE INCLUDING AT LEAST ONE ANTENNA, AND ELECTRONIC DEVICE AND METHOD FOR IMPROVING ANTENNA PERFORMANCE USING SAME

CROSS-REFERENCE TO RELATED APPLICATION

This application is based on and claims priority under 35 U.S.C. § 119 to Korean Patent Application No. 10-2019-0066692, filed on Jun. 5, 2019, in the Korean Intellectual Property Office, the disclosure of which is incorporated by reference herein in its entirety.

BACKGROUND

1) Field

The disclosure relates to an external device including at least one antenna, and an electronic device and a method for improving antenna performance using the same.

2) Description of Related Art

With the development of technology, portable electronic devices (e.g. mobile terminals, smartphones, and tablet PCs) for providing various functions (e.g. a phone function, an Internet function, a multimedia function, and a function of execution of various applications) including a communication function have been popularized.

Recently, each of these electronic devices additionally includes a near field communication (NFC) antenna in addition to an antenna for existing voice communication or data communication and additionally provides a payment function using NFC, thereby providing an additional user convenience function.

In order for an electronic device to secure portability while providing various functions, various components must be installed in a limited space. Thus, it may be difficult for the electronic device to secure a space for installing an NFC antenna large enough to provide the various functions.

The above information is presented as background information only to assist with an understanding of the disclosure. No determination has been made, and no assertion is made, as to whether any of the above might be applicable as prior art with regard to the disclosure.

SUMMARY

Embodiments of the disclosure provide an external device including at least one antenna and an electronic device and a method for improving antenna performance using the same.

Embodiments of the disclosure also improve antenna performance of an electronic device by including at least one NFC antenna in an external device and connecting the electronic device to the external device.

Embodiments of the disclosure also provide an external device including at least one antenna and an electronic device and a method for improving antenna performance using the same.

An electronic device according to various example embodiments may include: a housing; a communication module comprising circuitry coupled to at least one surface of the housing and configured to be connected to an external device including multiple near field communication (NFC) antennas; and a processor, wherein the processor may be configured to: obtain device information of the external device from the external device based on the external device being coupled to the electronic device; generate antenna setting information for setting the multiple NFC antennas of the external device based on at least one of the device information of the external device and device information of the electronic device; and to control the electronic device to transmit the generated antenna setting information to the external device to control setting of the multiple NFC antennas.

An electronic device according to various example embodiments may include: a cover configured to be coupled to one surface of an external device; multiple near field communication (NFC) antennas; and a processor, wherein the processor may be configured to: control the electronic device to transmit device information of the electronic device to the external device based on the external device being coupled to the electronic device; receive antenna setting information for the multiple NFC antennas from the external device; and select and activate at least one of the multiple NFC antennas based on the antenna setting information and deactivate the other NFC antennas.

According to various example embodiments, a method of an electronic device, configured to be connected to an external device including multiple near field communication (NFC) antennas and configured to provide an NFC function, may include: obtaining device information of the external device from the external device based on the external device being coupled to the electronic device; generating antenna setting information for setting the multiple NFC antennas of the external device based on at least one of the device information of the external device and device information of the electronic device; and transmitting the generated antenna setting information to the external device to control setting of the multiple NFC antennas.

In an external device including at least one antenna and an electronic device for improving antenna performance using the same according to various example embodiments, it is possible to improve antenna performance for NFC communication by connecting the electronic device to the external device including at least one NFC antenna.

An electronic device according to various example embodiments can smoothly provide an NFC communication function through connection to an external device. Therefore, the electronic device can provide various functions and can be miniaturized and inexpensively produced.

Effects obtainable from the disclosure are not limited to the effects described above, and other undescribed effects may be clearly understood by a person skilled in the art, to which the disclosure belongs, from the description below.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
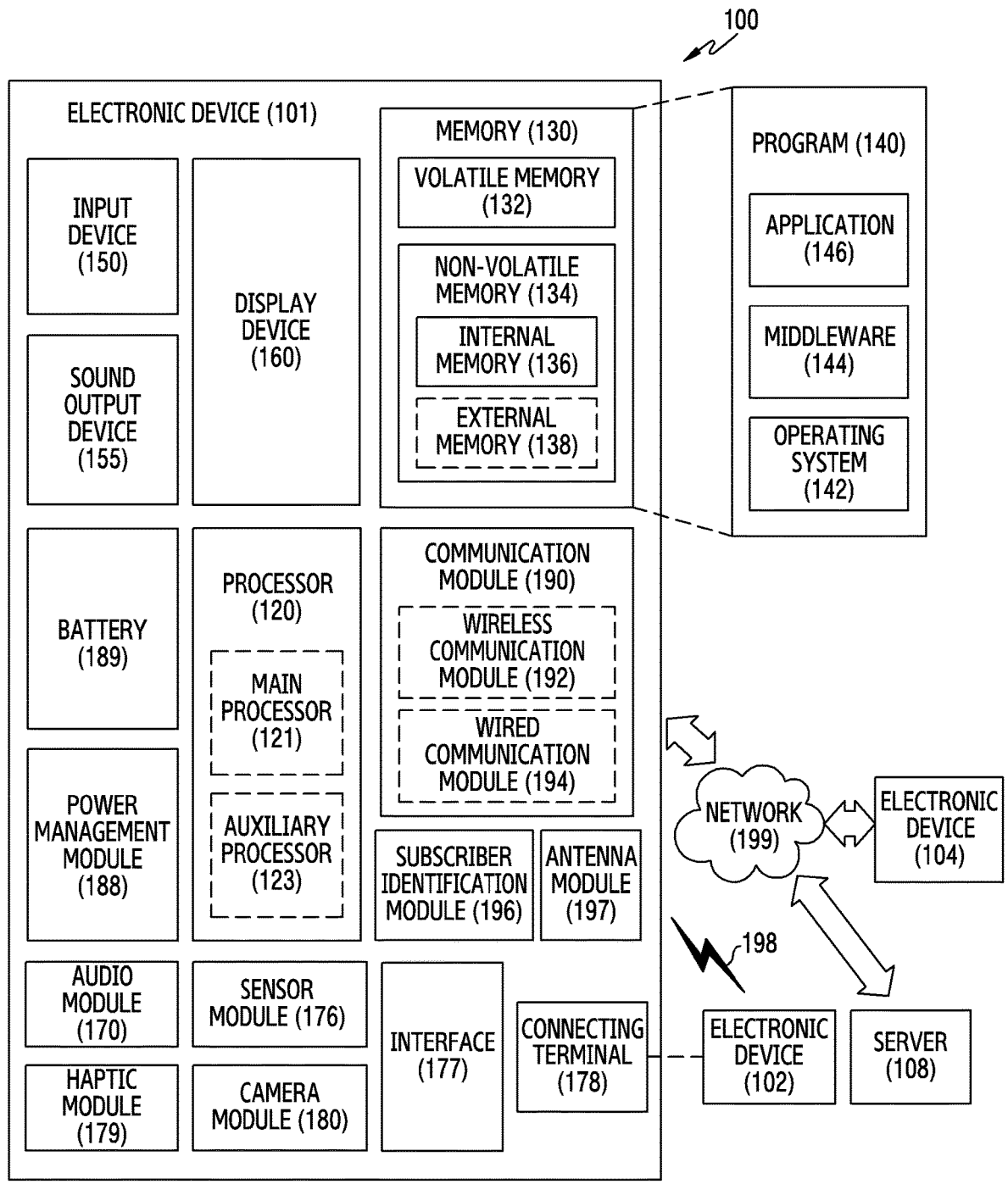
FIG. 1 is a block diagram illustrating an example electronic device in a network environment, capable of improving antenna performance using an external device according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
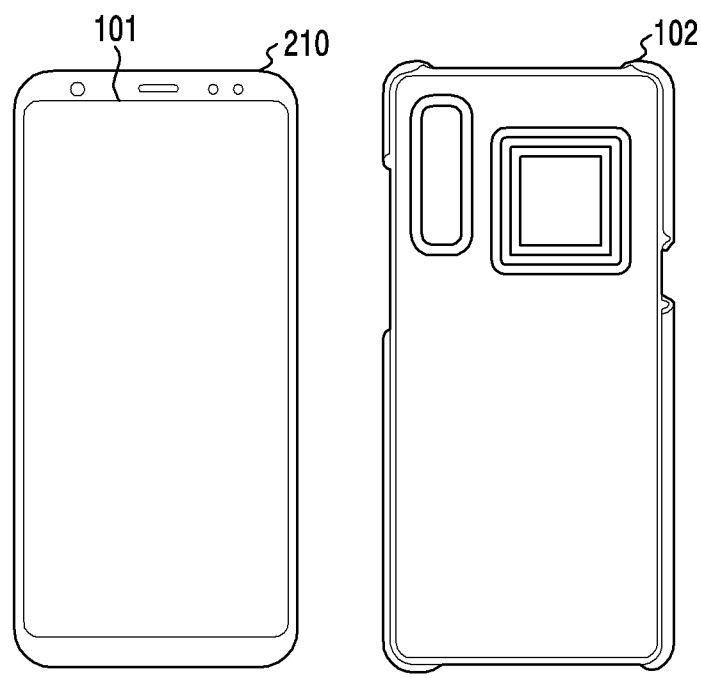
FIG. 2 is a diagram illustrating an example of an environment including an external device and an electronic device capable of improving antenna performance through communication with the external device according to various embodiments.

FIG. 2 is a diagram illustrating an example of an environment including an external device and an electronic device capable of improving antenna performance through communication with the external device according to various embodiments.

Referring to FIG. 2, an electronic device (e.g. the electronic device 101 in FIG. 1) according to various embodiments may be various types of electronic device, such as a smartphone, a tablet PC, or the like, configured to be coupled to an external device (e.g. the external device 102 in FIG. 1). The external device 102 may be detachably coupled to the electronic device 101. The external device 102 may be, for example, an accessory device (e.g. a protection cover).

The external device 102 according to various embodiments may be coupled to at least a portion (e.g. the rear surface and side surface) of a housing 210 of the electronic device 101. The external device 102 may protect at least a portion of the electronic device 101.

According to various embodiments, a description has been made of an example in which the external device 102 is coupled to a portion of the electronic device 101 in order to protect the portion of the electronic device 101. However, the external device 102 may further include a first cover (not shown) coupled to one portion of the electronic device 101 in order to protect the portion of the electronic device 101 and a second cover (not shown) for protecting another portion (e.g. the front surface) of the electronic device 101, in particular, a display of the electronic device 101.

The electronic device 101 according to various embodiments may include a sensor (e.g. a hall IC) so as to sense a sensing member disposed in the external device 102. The sensing member may include at least one magnetic body. The magnetic body may be disposed in a position in which the magnetic body can face the sensor. In the state in which the external device 102 is coupled to the rear surface of the electronic device 101, when the magnetic body and the sensor are positioned within a predetermined distance therebetween, the sensor may recognize that the external device 102 is in a coupled state. The sensor may sense the strength of magnetic flux. When the magnetic flux is sensed to have a predetermined strength or more, the sensor senses that the external device 102 is coupled to the rear surface, and may transmit a sensed signal to a processor (e.g. the processor 120 in FIG. 1).

According to various embodiments, when the electronic device 101 recognizes coupling between the same and the external device 102, the electronic device 101 may authenticate the external device 102 to receive device information of the external device 102, and may improve antenna performance for NFC communication using at least one NFC antenna installed in the external device 102.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor(e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 3:
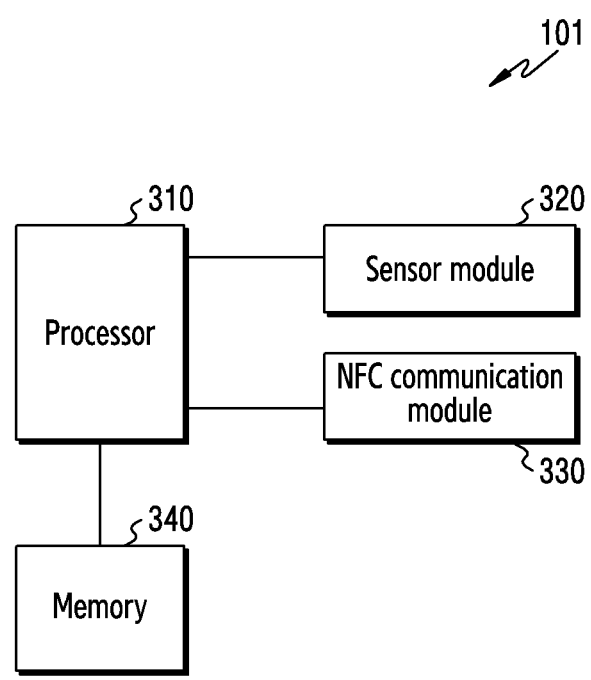
FIG. 3 is a block diagram illustrating an example of an electronic device capable of improving antenna performance using an external device according to various embodiments.

FIG. 3 is a block diagram an example electronic device capable of improving antenna performance using an external device according to various embodiments.

An electronic device (e.g. the electronic device 101 in FIG. 1) according to various embodiments may include a processor (e.g., including processing circuitry) 310, a sensor module (e.g., including at least one sensor) 320, an NFC communication module (e.g., including NFC circuitry) 330, and a memory 340. The processor 310 may include, for example, the processor 120 in FIG. 1.

According to various embodiments, the sensor module 320 may sense that an external device (e.g. the external device 102 in FIG. 1) is coupled to the rear surface of the electronic device 101, and may transmit a sensed signal to the processor 310.

According to various embodiments, the sensor module 320 may sense coupling of the external device 102. For example, the sensor module 320 may be a hall IC capable of sensing a magnetic field change, and thus may sense a magnetic body included in the external device 102. This is merely an example, and the electronic device 101 may sense coupling of the external device 102 in various manners. For example, the sensor module 320 may, for example, be a switch which can be pressed by the inner surface of the external device 102 at the time of fastening of the external device 102. In this case, the external device 102 may not include a magnetic body.

According to various embodiments, the memory 340 may include, for example, the memory 130 in FIG. 1. The memory 340 may store various types of data required for operation of the processor 310.

According to various embodiments, the memory 340 may include device information of the external device 102 NFC antenna configuration information (e.g. an antenna position and/or an antenna size and/or an antenna number) of the external device 102 corresponding to the type or model of the external device 102.

According to various embodiments, the memory 340 may include a device information of the electronic device 101 including NFC antenna configuration information (e.g. an antenna position, an antenna size, and/or an antenna number) applicable to the electronic device 101 based on the type or model of the electronic device 101.

According to various embodiments, the memory 340 may include NFC antenna setting information for deactivating or activating each of the NFC antennas (e.g. an antenna position, an antenna size and/or an antenna number and setting information thereof) of the external device 102 generated based on the NFC antenna configuration information of the external device 102 and the NFC antenna configuration information applicable to the electronic device 101 based on the type or model of the electronic device 101.

According to various embodiments, the NFC communication module 330 may include various NFC circuitry and perform short-range communication with the external device 102 using a short-range wireless communication protocol (e.g. an NFC protocol). For example, the NFC communication module 330 may transmit power and/or data to the external device 102 via an antenna (not shown) for communicating with the external device 102 according to control of the processor 310. The antenna (not shown) for communicating with the external device 102 may be implemented, for example, in a loop shape. Although not illustrated, the electronic device 101 may be implemented so as to include a transmission/reception terminal positioned to correspond to a transmission/reception terminal of the external device 102 and to transmit or receive power and/or data in a wired manner.

According to various embodiments, when the external device 102 is coupled to the electronic device 101, the NFC communication module 330 may transmit, under control of the processor 310, power and an authentication request signal to the external device 102, and may receive a response signal corresponding to the authentication request signal from the external device 102.

According to various embodiments, the NFC communication module 330 may obtain data including control information or payment information such as card information from the processor 310, and may transmit the obtained data to the external device 102.

According to various embodiments, when the coupling of the external device 102 is sensed via the sensor module 320, the processor 310 may include various processing circuitry and control the NFC communication module 330 to transmit power and an authentication request signal for performing authentication between the electronic device 101 and the external device 102 to the external device 102 via the NFC communication module 330. The authentication may be an operation for determining whether the external device 102 is a genuine product. The power may have a power level (e.g. 1 W) required to operate elements of the external device 102, which perform authentication between the electronic device 101 and the external device 102.

According to various embodiments, the processor 310 may receive a response signal corresponding to an authentication request signal from the external device 102, and when authentication of the external device 102 is completed based on the response signal, the processor 310 may control the NFC communication module 330 to transmit power to the external device 102 via the NFC communication module 330.

According to various embodiments, when coupling of the external device 102 is sensed, the processor 310 may identify the type of the external device 102 (information related to the external device, e.g. a model name, a model ID, or a model number) based on device information of the external device 102. For example, the processor 310 may receive device information, including at least one among a product name, a model ID, or a model number, from the external device 102 via the NFC communication module 330, and may identify the type of the external device 102 based on the device information.

According to various embodiments, the device information of the external device 102 may include an identifier for identifying the type of the external device 102.

According to various embodiments, the device information of the external device 102 may be included in the response signal corresponding to the authentication request signal.

According to various embodiments, the device information of the external device 102 may be received by the electronic device 101 while being included in a separate signal after the authentication is completed.

According to various embodiments, the processor 310 may identify NFC antenna setting information of the external device 102, which is suitable for performing a function of the electronic device 101, and which is generated based on the type of the external device 102 and the type of the electronic device 101. For example, the processor 310 may generate antenna setting control information based on the NFC antenna setting information, and may transmit the generated antenna setting control information to the external device 102.

According to various embodiments, the processor 310 may identify, from the memory 340, the NFC antenna configuration information (e.g. an antenna position, an antenna size and/or an antenna number) of the external device 102 based on the type of the external device 102.

According to various embodiments, the processor 310 may identify, from the memory 340, NFC antenna configuration information (e.g. an antenna position and/or an antenna size and/or an antenna number) applicable to the electronic device 101 based on the type of the electronic device 101.

According to various embodiments, the processor 310 may identify, via a server (e.g. the server 108 in FIG. 1), the NFC antenna configuration information (e.g. an antenna position and/or an antenna size and/or an antenna number) applicable to the electronic device 101 based on the type of the electronic device 101. To this end, the processor 310 may access to the server 108 to download necessary information or may receive necessary information from the server 108.

According to various embodiments, the processor 310 may generate NFC antenna setting information of the external device 102 based on the NFC antenna configuration information of the external device 102; and the NFC antenna configuration information applicable to the electronic device 101 based on the type of the electronic device 101.

According to various embodiments, the processor 310 may identify, from the memory 340, the NFC antenna setting information (e.g. an antenna position and/or an antenna size and/or an antenna number) of the external device 102, which is applicable to the electronic device 101 based on the type or model of the electronic device 101 and the type or model of the external device 102.

According to various embodiments, the processor 310 may control the electronic device 101 to transmit control information for setting an NFC antenna of the external device 102 to the external device 102. The NFC antenna setting control information of the external device 102 may include the NFC antenna setting information of the external device 102.

Figure 4:
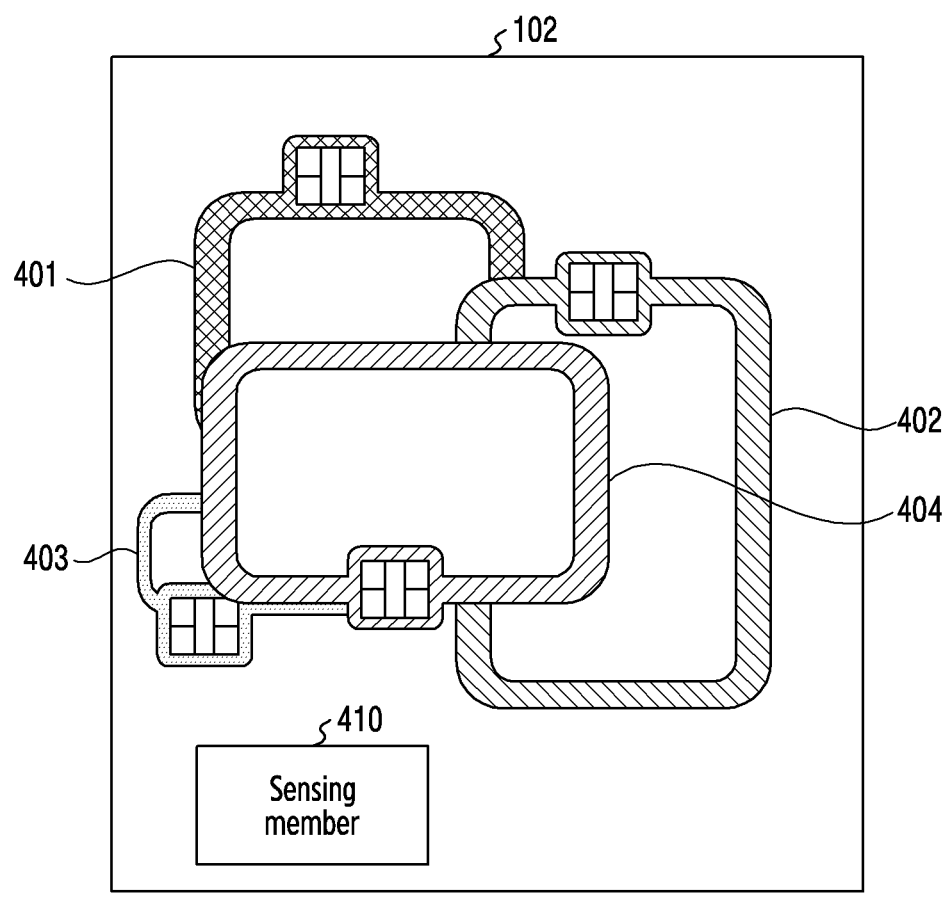
FIG. 4 is a diagram illustrating an example of an external device according to various embodiments.
Figure 5:
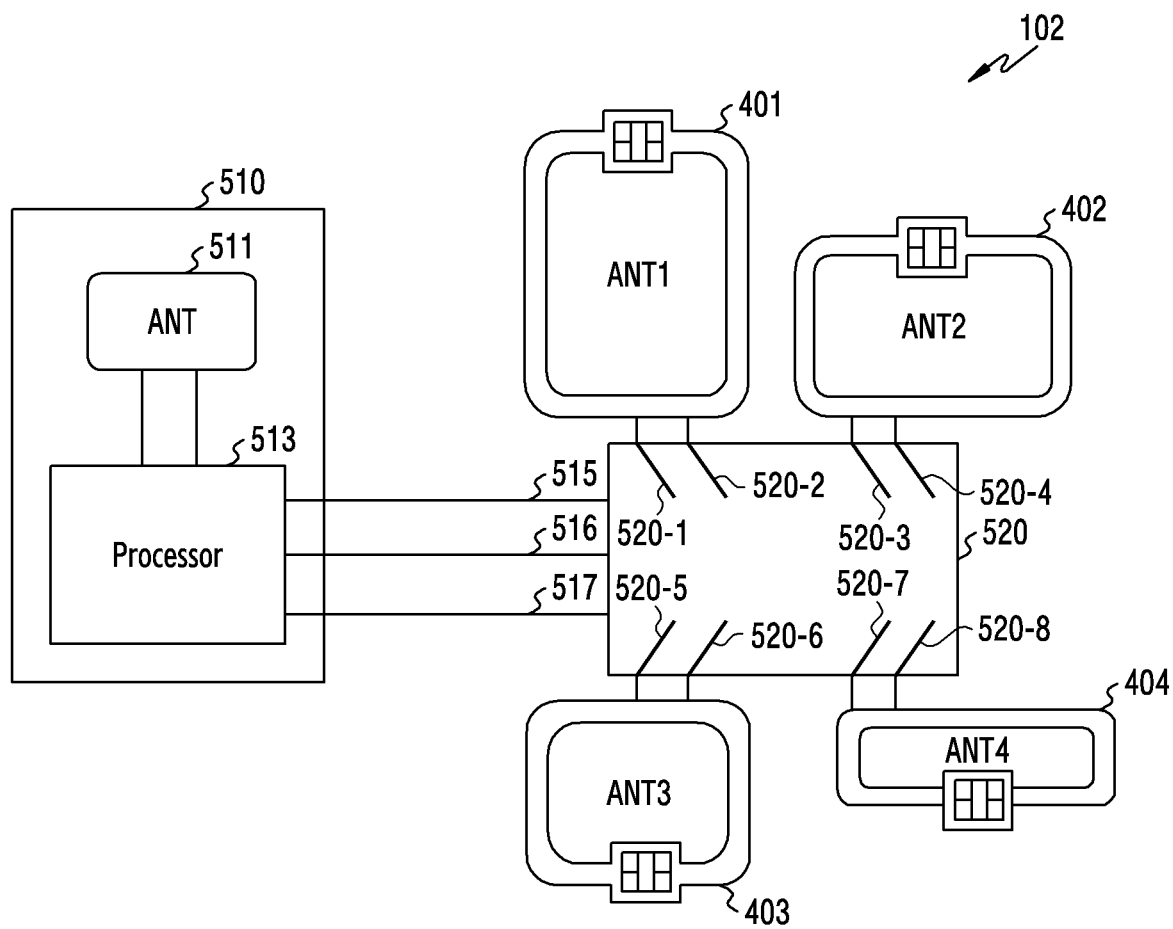
FIG. 5 is a diagram illustrating an example configuration of an external device according to various embodiments.

FIG. 4 is a diagram illustrating an example external device according to various embodiments, and FIG. 5 is a diagram illustrating an example configuration of an external device according to various embodiments.

Referring to FIG. 4, the external device 102 according to various embodiments may include multiple different NFC antennas 401, 402, 403 and 404. The external device 102 may include a sensing member 410. Referring to FIG. 5, the external device 102 according to various embodiments may include an antenna 511, a processor (e.g., including processing circuitry) 513, a switch 520, and the NFC antennas 401, 402, 403, and 404. The antenna 511 and the processor 513 may be included in an authentication block 510.

According to various embodiments, the NFC antennas 401, 402, 403, and 404 may have different sizes and/or shapes as illustrated. The NFC antennas 401, 402, 403, and 404 may be arranged to overlap each other.

According to various embodiments, the number, size, shape, and/or arrangement form of the NFC antennas 401, 402, 403, and 404 are not limited thereto, and may be appropriately selected and arranged in consideration of appropriate antenna configuration conditions required in the housing and elements of the external device 102 and/or in the electronic device 101.

According to various embodiments, the NFC antennas 401, 402, 403, and 404 may be attached or coupled to the housing of the external device 102. The housing of the external device 102 may have various shapes and/or sizes depending on the shape and/or size of the external device 102. The NFC antennas 401, 402, 403, and 404 may be mounted on one surface of the housing of the external device 102. The NFC antennas 401, 402, 403, and 404 may be fixed to the housing of the external device 102 using, for example, a coupling member. The NFC antennas 401, 402, 403, and 404 may be inserted into one surface of the housing of the external device 102. The NFC antennas 401, 402, 403, and 404 may be removably attached to the housing of the external device 102. In this case, for example, the NFC antennas 401, 402, 403, and 404 may be formed in a card shape.

According to various embodiments, the sensing member 410 may be used to sense whether the external device 102 is fastened to an electronic device (e.g. the electronic device 101 in FIG. 1). The sensing member 410 may be provided in a position corresponding to the sensor module (e.g., the sensor module 320 in FIG. 3) of the electronic device 101. The sensing member 410 may be a magnetic body, but, as set forth above, is not limited thereto.

According to various embodiments, if the electronic device 101 has a switch which can be pressed by the inner surface of the external device 102 when the external device 102 is fastened to the electronic device 101, the external device 102 may not include a magnetic body.

According to various embodiments, the antenna 511 may be used to transmit and/or receive power and/or data to or from the electronic device 101. The antenna 511 may be implemented in a shape similar to an antenna (not shown) with which the electronic device 101 is provided to communicate with the external device 102. For example, the antenna 511 may be implemented in a loop shape. Although not illustrated, the external device 102 may be implemented so as to include a transmission/reception terminal positioned to correspond to the transmission/reception terminal of the electronic device 101 and to transmit or receive power and/or data in a wired manner.

According to various embodiments, the processor 513 may include various processing circuitry and receive power and an authentication request signal necessary for authenticating the external device 102 from the electronic device 101 via the antenna 511, and may transmit a response signal to the electronic device 101 via the antenna 511.

According to various embodiments, the response signal corresponding to the authentication request may include, for example, authentication information of the external device 102. The authentication information of the external device 102 may be information preconfigured between the electronic device 101 and the external device 102 in order to determine whether the external device 102 is a genuine product.

According to various embodiments, the processor 513 may operate using power received from the electronic device 101 via the antenna 511.

According to various embodiments, the processor 513 may perform an authentication procedure of the external device 102 and/or a procedure for identifying the type of the external device 102 while communicating with the electronic device 101. The authentication procedure of the external device 102 and the procedure for identifying the type of the external device 102 may be separately performed as separate procedures, the identification procedure may be performed sequentially after the authentication procedure is completed, or the identification procedure may be performed within the authentication procedure. To this end, the processor 513 may include a communication module (not shown).

According to various embodiments, the processor 513 may receive an authentication request signal and power for driving via the antenna 511 when the external device 102 is attached to the electronic device 101. The processor 513 may transmit a response signal corresponding to the authentication request to the electronic device 101 via the antenna 511. The response signal corresponding to the authentication request may include the authentication information of the external device 102.

According to various embodiments, when the authentication request signal is received from the electronic device 101 via the antenna 511, the processor 513 may include device information for determining the type of the external device 102 in the response signal corresponding to the authentication request and may transmit the response signal.

According to various embodiments, when the authentication request signal is received from the electronic device 101 via the antenna 511, the processor 513 may transmit authentication information for performing authentication to the electronic device 101 in response to the authentication request signal. When the authentication is completed by the electronic device 101, the processor 513 may transmit device information for determining the type of the external device 102 to the electronic device 101 through a separate signal.

According to various embodiments, the processor 513 may receive information for controlling setting of the NFC antennas 401, 402, 403, and 404 from the electronic device 101 via the antenna 511.

According to various embodiments, the information for controlling the setting of the NFC antennas 401, 402, 403, and 404 may include, for example, control information for selecting and activating at least one (e.g. the NFC antenna 401) of the NFC antennas 401, 402, 403, and 404 and deactivating the other antennas (e.g. the NFC antennas 402, 403, and 404).

According to various embodiments, the processor 513 may control the switch 520 according to the antenna setting control information received from the electronic device 101 such that the switch 520 controls antenna setting including an on/off control of each of the NFC antennas 401, 402, 403, and 404.

According to various embodiments, the processor 513 may turn on/off the switch 520 through a switch activation control signal line 515.

According to various embodiments, the processor 513 may control the on/off setting of each of the NFC antennas 401, 402, 403, and 404 through a switch operation control signal line 1 516 and a switch operation control signal line 2 517.

According to various embodiments, based on table 1 below, the processor 513 may control antenna setting through the switch activation control signal line 515 and the switch operation control signal lines 516 and 517. Table 1 is merely an example, and the number of control signal lines and/or a true/false value signal for controlling the switch 520 by the processor 513 via the control lines and antenna setting information corresponding thereto may be changed depending on the number, shape, and setting method of antennas.

TABLE 1

| Switch activation control signal line 515 | Switch operation control signal line 1 516 | Switch operation control signal line 2 517 | Antenna setting information |
|---|---|---|---|
| 0 | X | X | Disconnected |
| 1 | 0 | 0 | Antenna 1 activation: Connect switch 520-1 to switch 520-2 |
| 1 | 0 | 1 | Antenna 2 activation: Connect switch 520-3 to switch 520-4 |
| 1 | 1 | 0 | Antenna 3 activation: Connect switch 520-5 to switch 520-6 |
| 1 | 1 | 1 | Antenna 4 activation: Connect switch 520-7 to switch 520-8 |

Figure 6:
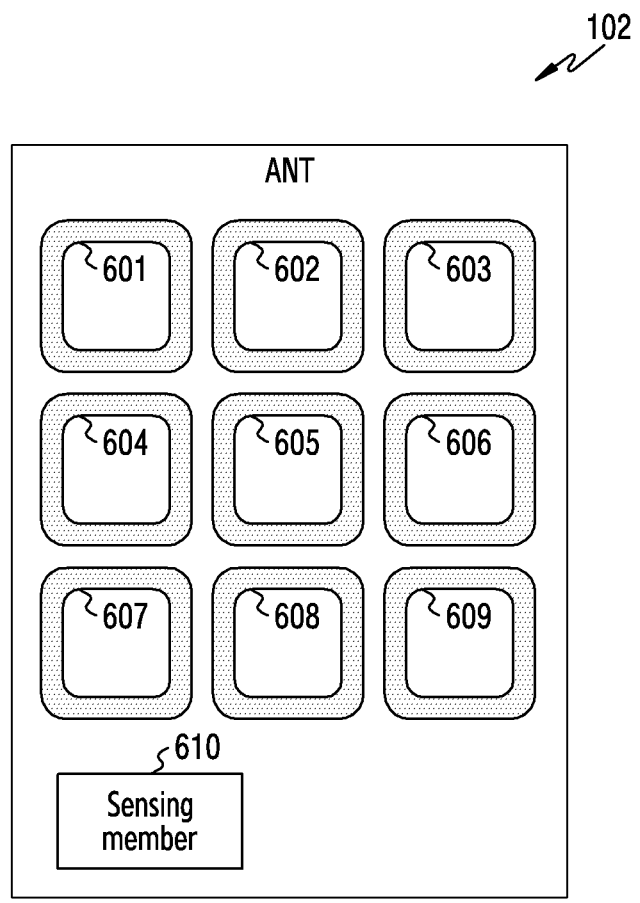
FIG. 6 is a diagram illustrating an example external device according to various embodiments.
Figure 7:
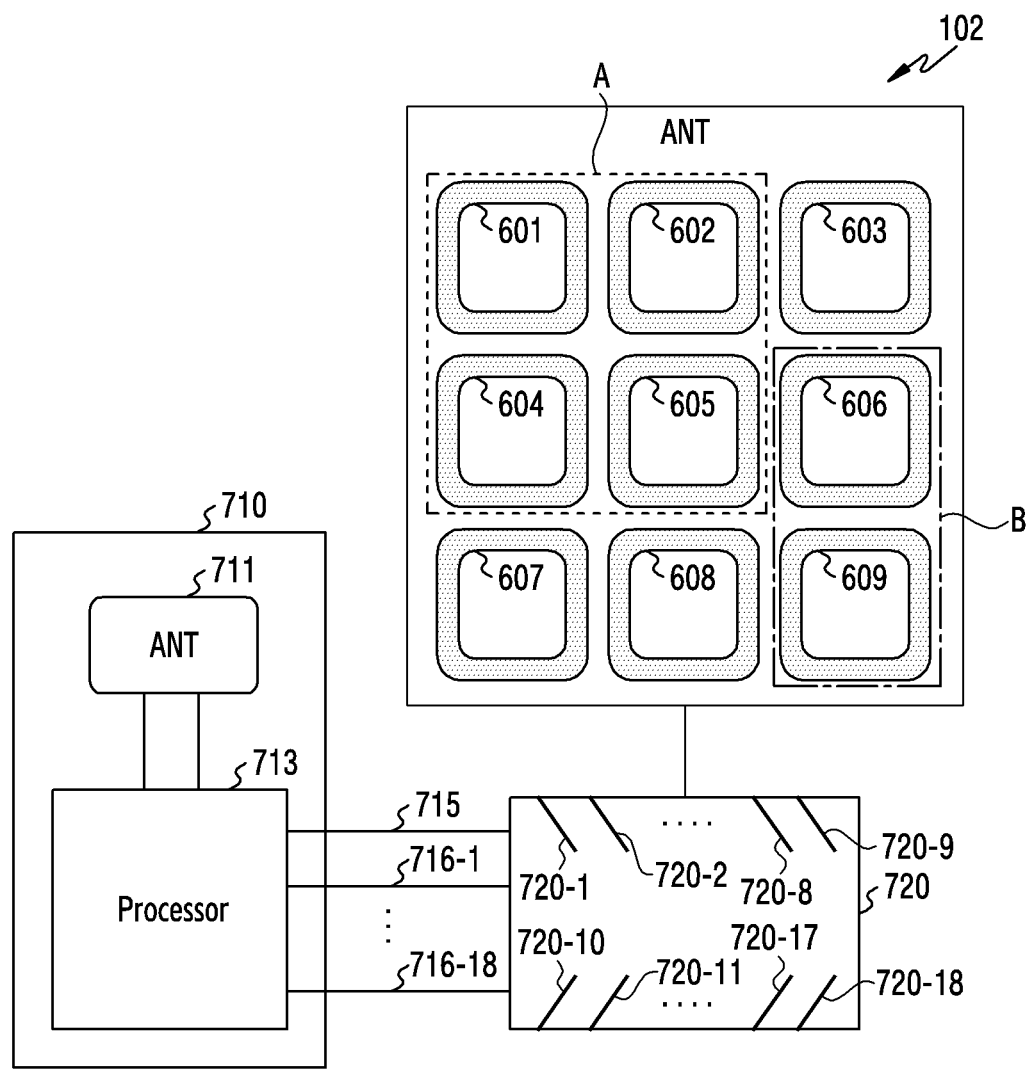
FIG. 7 is a diagram illustrating an example of the configuration of an external device according to various embodiments.

FIG. 6 is a diagram illustrating an example external device according to various embodiments, and FIG. 7 is a diagram illustrating an example configuration of an external device according to various embodiments.

Referring to FIG. 6, the external device 102 according to various embodiments may include multiple different NFC antennas 601, 602, 603, 604, 605, 606, 607, 608, and 609. The external device 102 may include a sensing member 610. Referring to FIG. 7, the external device 102 according to various embodiments may include an antenna 711, a processor (e.g., including processing circuitry) 713, a switch 720, and the NFC antennas 601, 602, 603, 604, 605, 606, 607, 608, and 609. The antenna 711 and the processor 713 may be included in an authentication block 710.

According to various embodiments, as illustrated, the NFC antennas 601, 602, 603, 604, 605, 606, 607, 608, and 609 may be arranged in a structure in which the NFC antennas may, for example, have substantially the same size and are regularly arranged in the cover of the external device 102 along multiple rows and columns. The arrangement of the NFC antennas 601, 602, 603, 604, 605, 606, 607, 608, and 609 is not limited thereto. The NFC antennas 601, 602, 603, 604, 605, 606, 607, 608, and 609 may be arranged in such a manner that the NFC antennas have different sizes, the NFC antennas are spaced at substantially the same distance apart from each other, or at least some thereof overlap each other.

According to various embodiments, the number, size, shape, and/or arrangement form of the NFC antennas 601, 602, 603, 604, 605, 606, 607, 608, and 609 are not limited thereto. The NFC antennas may be appropriately selected and arranged in consideration of appropriate antenna configuration conditions required in the housing and elements of the external device 102 and/or in the electronic device 101.

According to various embodiments, the NFC antennas 601, 602, 603, 604, 605, 606, 607, 608, and 609 may be attached or coupled to the housing of the external device 102. The housing of the external device 102 may have various shapes and/or sizes depending on the shape and/or size of the external device 102. The NFC antennas 601, 602, 603, 604, 605, 606, 607, 608, and 609 may be mounted on one surface of the housing of the external device 102. The NFC antennas 601, 602, 603, 604, 605, 606, 607, 608, and 609 may be fixed to the housing of the external device 102 using, for example, a coupling member. The NFC antennas 601, 602, 603, 604, 605, 606, 607, 608, and 609 may be inserted into one surface of the housing of the external device 102. The NFC antennas 601, 602, 603, 604, 605, 606, 607, 608, and 609 may be removably attached to the housing of the external device 102. In this case, for example, the NFC antennas 601, 602, 603, 604, 605, 606, 607, 608, and 609 may be formed in a card shape.

According to various embodiments, the sensing member 610 may be used to sense whether the external device 102 is fastened to an electronic device (e.g. the electronic device 101 in FIG. 1). The sensing member 610 may be provided in a position corresponding to the sensor module (e.g., the sensor module 320 in FIG. 3) of the electronic device 101. The sensing member 610 may be a magnetic body. However, as described above, the disclosure is not limited thereto.

According to various embodiments, if the electronic device 101 has a switch which can be pressed by the inner surface of the external device 102 when the external device 102 is fastened to the electronic device 101, the external device 102 may not include a magnetic body.

According to various embodiments, the antenna 711 may be used to transmit or receive power and/or data to or from the electronic device 101. The antenna 711 may be implemented in a shape similar to an antenna (not shown) with which the electronic device 101 is provided to communicate with the external device 102. For example, the antenna 711 may be implemented in a loop shape. Although not illustrated, the external device 102 may be implemented to include a transmission/reception terminal positioned to correspond to the transmission/reception terminal of the electronic device 101 and to transmit or receive power and/or data in a wired manner.

According to various embodiments, the processor 713 may include various processing circuitry and receive power and an authentication request signal necessary for authenticating the external device 102 from the electronic device 101 via the antenna 711, and may transmit a response signal to the electronic device 101 via the antenna 711.

According to various embodiments, the response signal corresponding to the authentication request may include, for example, authentication information of the external device 102. The authentication information of the external device 102 may be information preconfigured between the electronic device 101 and the external device 102 in order to determine whether the external device 102 is a genuine product.

According to various embodiments, the processor 713 may operate using power received from the electronic device 101 via the antenna 711.

According to various embodiments, the processor 713 may perform an authentication procedure of the external device 102 and/or a procedure for identifying the type of the external device 102 while communicating with the electronic device 101. The authentication procedure of the external device 102 and the procedure for identifying the type of the external device 102 may be separately performed as separate procedures, the identification procedure may be performed sequentially after the authentication procedure is completed, or the identification procedure may be performed within the authentication procedure. To this end, the processor 713 may include a communication module (not shown).

According to various embodiments, the processor 713 may receive an authentication request signal and power for driving via the antenna 711 when the external device 102 is attached to the electronic device 101. The processor 713 may transmit a response signal corresponding to the authentication request to the electronic device 101 via the antenna 711. The response signal corresponding to the authentication request may include the authentication information of the external device 102.

According to various embodiments, when the authentication request signal is received from the electronic device 101 via the antenna 711, the processor 713 may include device information for determining the type of the external device 102 in the response signal corresponding to the authentication request and may transmit the response signal.

According to various embodiments, when the authentication request signal is received from the electronic device 101 via the antenna 711, the processor 713 may transmit authentication information for performing authentication to the electronic device 101 in response to the authentication request signal. When the authentication is completed by the electronic device 101, the processor 713 may transmit device information for determining the type of the external device 102 to the electronic device 101 through a separate signal.

According to various embodiments, the processor 713 may receive antenna setting control information for controlling the setting of the NFC antennas 601, 602, 603, 604, 605, 606, 607, 608, and 609 from the electronic device 101 via the antenna 711.

According to various embodiments, the information for controlling the setting of the NFC antennas 601, 602, 603, 604, 605, 606, 607, 608, and 609 may include, for example, control information for selecting and activating one or more (e.g. the NFC antenna 601, 602, 604, and 605 in region A) of the NFC antennas 601, 602, 603, 604, 605, 606, 607, 608, and 609 and deactivating the other antennas (e.g. the NFC antennas 603, 606, 607, 608, and 609 outside region A).

According to various embodiments, the information for controlling the setting of the NFC antennas 601, 602, 603, 604, 605, 606, 607, 608, and 609 may include, for example, control information for: selecting and activating antennas (e.g. the NFC antennas 601, 602, 604, and 605 in region A and the antennas 606 and 609 in region B), included in at least one of one or more regions, among the NFC antennas 601, 602, 603, 604, 605, 606, 607, 608, and 609; and deactivating the other antennas outside at least one selected region (e.g. the NFC antennas 603, 606, 607, 608, and 609 outside region A, the NFC antennas 601, 602, 603, 604, 605, 607, and 608 outside region B, or the NFC antennas 603, 607, and 608 outside regions A and B).

According to various embodiments, the processor 713 may control the switch 720 according to the antenna setting control information received from the electronic device 101 such that the switch 720 controls antenna setting including an on/off control of each of the NFC antennas 601, 602, 603, 604, 605, 606, 607, 608, and 609.

According to various embodiments, the processor 713 may turn on/off the switch 720 through a switch activation control signal line 715.

According to various embodiments, the processor 713 may control the on/off setting of each of the NFC antennas 601, 602, 603, 604, 605, 606, 607, 608, and 609 through a switch operation control signal line 1 716-1 or a switch operation control signal line 2 716-18.

An electronic device (e.g. the electronic device 101 in FIG. 1 or 3) according to various example embodiments may include: a housing (e.g., the housing 210 in FIG. 2); a communication module (e.g. the communication module 330 in FIG. 3) comprising circuitry coupled to at least one surface of the housing and configured to be connected to an external device (e.g. the external device 102 in FIG. 1 or 4) including multiple near field communication (NFC) antennas (e.g. the NFC antennas 401, 402, 403, and 404 in FIG. 4); and a processor (e.g. the processor 120 in FIG. 1 or the processor 310 in FIG. 3).

According to various example embodiments, the processor may be configured to: obtain device information of the external device from the external device based on the external device being coupled; generate antenna setting information for setting the multiple NFC antennas of the external device, based on at least one of the device information of the external device and device information of the electronic device; and control the electronic device to transmit the generated antenna setting information to the external device to control the setting of the multiple NFC antennas.

According to various example embodiments, the processor may be configured to: control the electronic device to transmit an authentication request to authenticate the external device; and obtain the device information of the external device from a response signal corresponding to the authentication request.

According to various example embodiments, the electronic device may further include a sensor configured to sense coupling of the external device based on the external device being coupled to the electronic device. The processor may be configured to: determine, based on receiving a sensing signal from the sensor, that the external device is coupled; and control the electronic device to transmit an authentication request signal to the external device for authenticating the external device.

According to various example embodiments, the device information of the external device may include at least one among a product name, a model ID, or a model number of the external device.

According to various example embodiments, the electronic device may further include a memory (e.g. the memory 130 or 340 in FIG. 1 or 3) configured to store antenna information applicable to performing an NFC function of the electronic device based on the device information of the electronic device. The processor may be configured to generate the antenna setting information using the antenna information.

According to various example embodiments, the electronic device may further include a memory configured to store information on the multiple NFC antennas of the external device based on the device information of the external device. The processor may be configured to generate the antenna setting information using the antenna information.

According to various example embodiments, the antenna information may include at least one among a position, a size, or an antenna number of each of the multiple NFC antennas of the external device.

According to various example embodiments, the processor may be configured to: control the electronic device to transmit a signal requesting device information of the external device to the external device; and obtain the device information of the external device from a response signal corresponding to the signal.

According to various example embodiments, an electronic device (e.g. the external device 102 in FIG. 1 or 2) may include: a cover configured to be coupled to at least one surface of an external device (e.g. the electronic device 101 in FIG. 1); multiple near field communication (NFC) antennas; and a processor (e.g. the processor 513 in FIG. 5).

According to various example embodiments, the processor may be configured to: transmit device information of the electronic device to the external device based on the external device being coupled to the electronic device; receive antenna setting information for the multiple NFC antennas from the external device; and select and activate at least one of the multiple NFC antennas based on the antenna setting information and deactivate other NFC antennas.

According to various example embodiments, the at least one processor may be configured to activate antennas included in a specific region among the multiple NFC antennas, based on the antenna setting information, and deactivate antennas outside the specific region.

According to various example embodiments, the electronic device may further include switches (e.g. the switches 520-1, 520-2, 520-3, 520-4, 520-5, 520-6, 520-7, and 520-8 in FIG. 5) configured to control setting of the multiple NFC antennas.

According to various example embodiments, the multiple NFC antennas may have substantially the same size and may be regularly arranged along multiple rows and columns in the cover.

Figure 8:
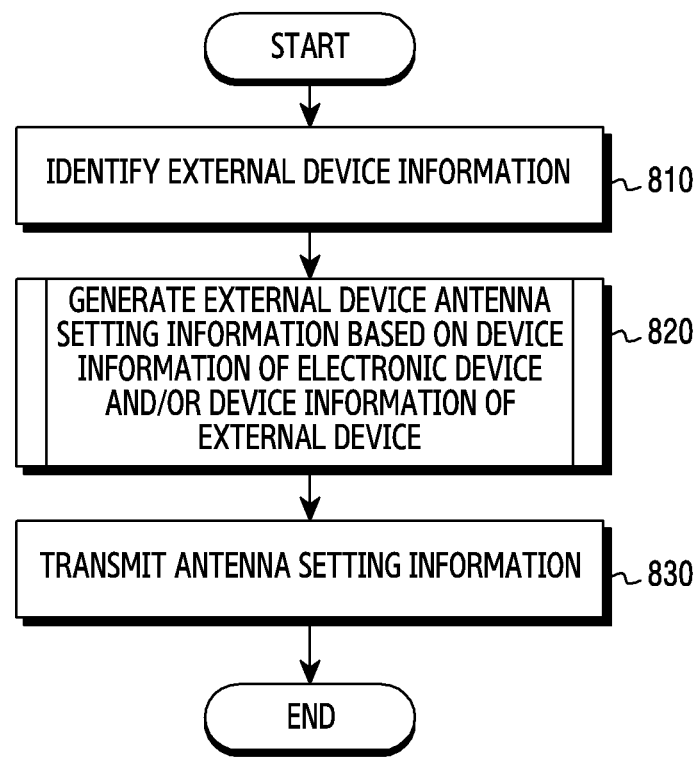
FIG. 8 is a flowchart illustrating an example operation in which an electronic device improves antenna performance using an external device according to various embodiments.

FIG. 8 is a flowchart illustrating an example operation in which an electronic device (e.g. the electronic device 101 in FIGS. 1, 2, and 3) improves antenna performance using an external device (e.g. the external device 102 in FIGS. 1, 2, and 4 to 7) according to various embodiments.

When the external device 102 is coupled, a processor (e.g. the processor 120 in FIG. 1 or the processor 310 in FIG. 3) of the electronic device 101 may obtain device information of the external device 102 from the external device 102 in operation 810.

According to various embodiments, the processor 120 or 310 may obtain device information of the external device 102 in the process of authenticating the external device 102. According to various embodiments, the processor 120 or 310 may obtain the device information of the external device 102 from a response signal corresponding to an authentication request transmitted to the external device 102. The device information of the external device 102 may include, for example, information for identifying the type of the external device 102 (information related to the external device, e.g. a model name, a model ID, or a model number).

According to various embodiments, in operation 820, based on device information of the electronic device and/or the device information of the external device 102, the processor 120 or 310 may generate NFC antenna setting information of the external device 102 suitable for performing an NFC function of the electronic device 101. According to various embodiments, based on the device information of the external device 102, the processor 120 or 310 may obtain NFC antenna configuration information of the external device 102. According to various embodiments, based on the device information of the electronic device 101, the processor 120 or 310 may obtain NFC antenna configuration information suitable for performing an NFC function of the electronic device 101. According to various embodiments, based on the device information of the external device 102 and the device information of the electronic device 101, the processor 120 or 310 may obtain the NFC antenna configuration information of the external device 102 and the NFC antenna configuration information suitable for the electronic device 101 to generate NFC antenna setting information of the external device 102 suitable for performing an NFC function of the electronic device 101.

The device information of the electronic device 101 may include, for example, information for identifying the type of the electronic device 101 (information related to the electronic device, e.g. a model name, a model ID, or a model number). The device information of the external device 102 may include, for example, information for identifying the type of the external device 102 (information related to the external device, e.g. a model name, a model ID, or a model number).

According to various embodiments, in operation 830, the processor 120 or 310 may control the electronic device to transmit the generated NFC antenna setting information to the external device 102 as information for controlling setting of NFC antennas of the external device 102.

Figure 9:
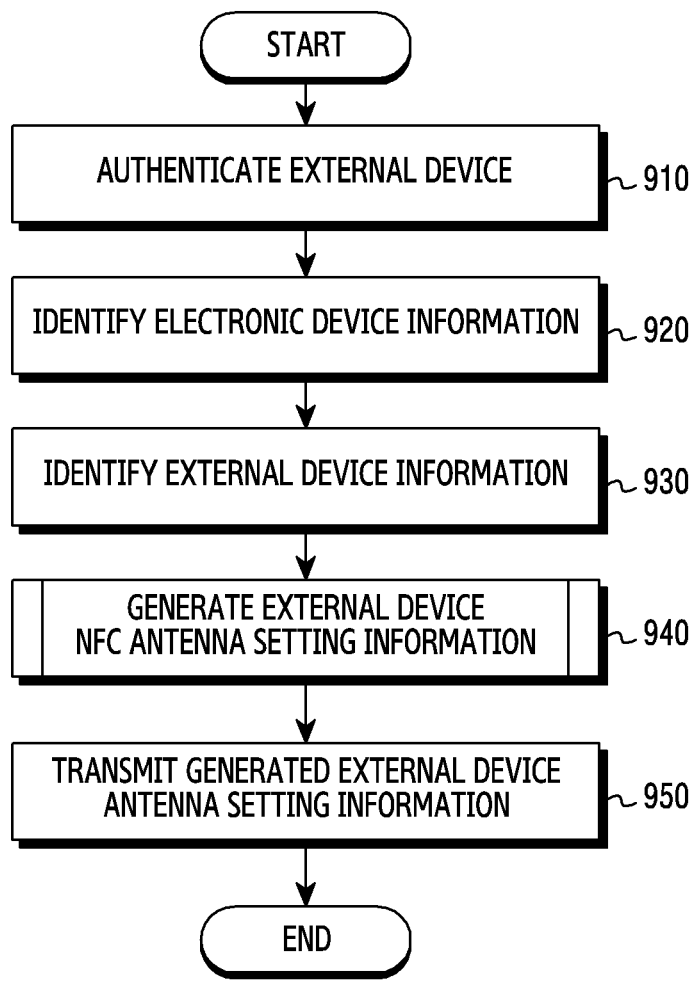
FIG. 9 is a flowchart illustrating an example operation in which an electronic device improves antenna performance using an external device according to various embodiments.

FIG. 9 is a flowchart illustrating an example operation in which an electronic device (e.g. the electronic device 101 in FIGS. 1, 2, and 3) improves antenna performance using an external device (e.g. the external device 102 in FIGS. 1, 2, and 4 to 7) according to various embodiments.

According to various embodiments, when the external device 102 is coupled, a processor (e.g. the processor 120 in FIG. 1 or the processor 310 in FIG. 3) may authenticate the external device 102 in operation 910.

According to various embodiments, the processor 120 or 310 may transmit an authentication request signal to the external device 102, and may receive a response signal corresponding to the authentication request signal from the external device 102. The processor 120 or 310 may authenticate the external device 102 using authentication information of the external device 102 included in the authentication response signal.

According to various embodiments, in operation 920, the processor 120 or 310 may identify device information of the electronic device 101. The device information of the electronic device 101 may include, for example, information for identifying the type of the electronic device 101 (information related to the electronic device, e.g. a model name, a model ID, or a model number).

According to various embodiments, in operation 930, the electronic device 101 may identify device information of the external device 102 which has been received from the external device 102. The device information of the external device 102 may include, for example, information for identifying the type of the external device 102 (information related to the external device, e.g. a model name, a model ID, or a model number). Operations 920 and 930 may be performed in reverse order or may be simultaneously performed.

According to various embodiments, in operation 940, based on the device information of the electronic device 101 and the device information of the external device 102, the processor 120 or 310 may generate NFC antenna setting information of the external device 102 suitable for performing an NFC function of the electronic device 101.

According to various embodiments, the processor 120 or 310 may receive, from a memory (e.g. the memory 340 in FIG. 3), NFC antenna configuration information (e.g. an antenna position and/or an antenna size and/or an antenna number) of the external device 102 based on the device information of the external device 102. According to various embodiments, the processor 310 may receive, from the memory 340, NFC antenna configuration information (e.g. an antenna position and/or an antenna size and/or an antenna number) applicable to the electronic device 101 based on the device information of the electronic device 101. According to various embodiments, the processor 310 may generate antenna setting information of the external device 102 based on the NFC antenna configuration information of the external device 102 and the NFC antenna configuration information applicable to the electronic device 101 based on the device information of the external device 102 and the electronic device 101.

According to various embodiments, in operation 950, the processor 310 may transmit the generated antenna setting information of the external device 102 to the external device 102 as information for controlling setting NFC antennas of the external device 102.

Figure 10:
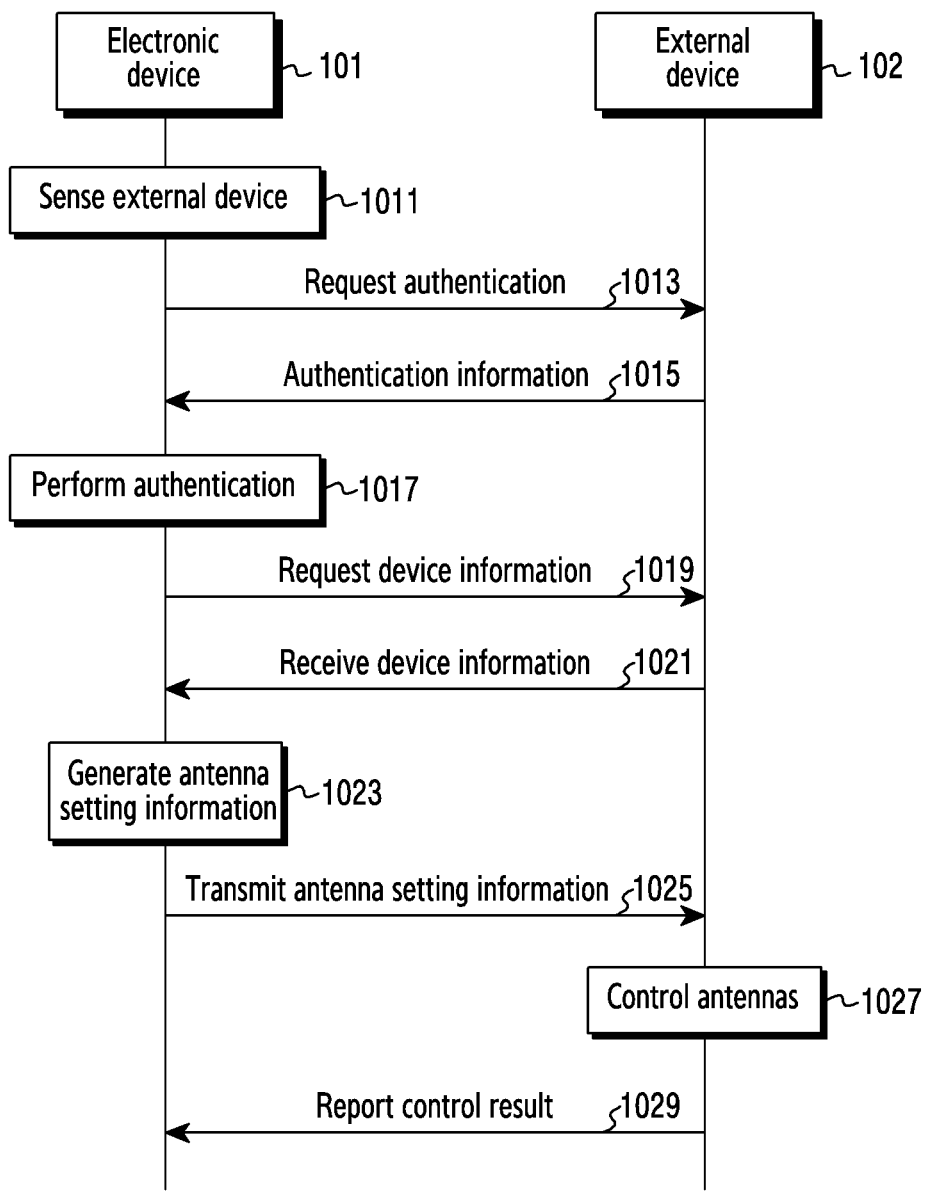
FIG. 10 is a signal flow diagram illustrating example operations which an electronic device and an external device perform to improve antenna performance according to various embodiments.

FIG. 10 is a signal flow diagram illustrating example operations which an electronic device (e.g. the electronic device 101 in FIGS. 1, 2, and 3) and an external device (e.g. the external device 102 in FIGS. 1, 2, and 4 to 7) perform in order to improve antenna performance according to various embodiments.

According to various embodiments, in operation 1011, a processor (e.g. the processor 120 in FIG. 1 or the processor 310 in FIG. 3) of the electronic device 101 may sense that the external device 102 is coupled to the electronic device 101. The processor 120 or 310 may sense the external device 102 by receiving a signal generated due to the coupling. The signal may be, for example, a sensor signal for sensing coupling.

According to various embodiments, in operation 1013, the processor 120 or 310 may transmit a signal requesting authentication of the external device 102 to the coupled external device 102.

According to various embodiments, in operation 1015, the processor 120 or 310 may receive a response signal including authentication information in response to the authentication request signal transmitted to the external device 102.

According to various embodiments, in operation 1017, the processor 120 or 310 may authenticate the external device 102 based on the authentication information received from the external device 102. The authentication of the external device 102 may be, for example, authentication of whether the external device 102 is a genuine product. The authentication information of the external device 102 may include, for example, an authentication key preconfigured between the electronic device 101 and the external device 102.

According to various embodiments, when the authentication of the external device 102 is successfully performed, in operation 1019, the processor 120 or 310 may request the external device 102 to transmit device information. According to another embodiment, operation 1019 of requesting the device information may be omitted.

According to various embodiments, in operation 1021, the processor 120 or 310 may receive the device information of the external device 102 from the external device 102. The device information of the external device 102 may include, for example, information for identifying the type of the external device 102 (e.g. information related to the external device, e.g. a model name, a model ID, or a model number).

According to various embodiments, in operation 1023, the processor 120 or 310 may generate antenna setting information for controlling setting of NFC antennas of the external device 102. To this end, the processor 120 or 310 may identify device information of the electronic device 101. The device information of the electronic device 101 may include, for example, information for identifying the type of the electronic device 101 (e.g. information related to the electronic device, e.g. a model name, a model ID, or a model number). According to various embodiments, the processor 120 or 310 may identify NFC antenna configuration information (e.g. an antenna position and/or an antenna size and/or an antenna number) of the external device 102 based the device information of the external device 102. According to various embodiments, the processor 120 or 310 may identify NFC antenna configuration information (e.g. an antenna position and/or an antenna size and/or an antenna number) applicable to the electronic device 101 based on the device information of the electronic device 101. According to various embodiments, the processor 120 or 310 may generate antenna setting information of the external device 102 based on the NFC antenna configuration information based the device information of the external device 102 and the NFC antenna configuration information applicable to the electronic device 101 based on the device information of the electronic device 101.

According to various embodiments, in operation 1025, the processor 310 may transmit the generated antenna setting information of the external device 102 to the external device 102 as information for controlling the setting of the NFC antennas of the external device 102.

According to various embodiments, in operation 1027, the external device 102 may control the NFC antennas based on the received information for controlling the setting of the NFC antennas.

According to various embodiments, based on antenna setting information for controlling setting of NFC antennas of the external device 102, a processor (e.g. the processor 513 in FIG. 5) of the external device 102 may select and activate at least one (e.g. the NFC antenna 401) of the multiple NFC antennas 401, 402, 403, and 404 illustrated in FIGS. 4 and 5 and may deactivate the other antennas (e.g. the NFC antennas 402, 403, and 404).

According to various embodiments, based on antenna setting information for controlling setting NFC antennas of the external device 102, a processor of the external device 102 (e.g. the processor 713 in FIG. 7) may select and activate antennas included in at least one region (e.g. the NFC antennas 601, 602, 604, and 605 in region A and the antennas 606 and 609 in region B) among the NFC antennas 601, 602, 603, 604, 605, 606, 607, 608, and 609 illustrated in FIG. 6 and FIG. 7, and may deactivate the other antennas outside the at least one selected region (e.g. the NFC antennas 603, 606, 607, 608, and 609 outside region A, the NFC antennas 601, 602, 603, 604, 605, 607, and 608 outside region B, or the NFC antennas 603, 607, and 608 outside regions A and B).

According to various embodiments, in operation 1029, the processor 513 or 713 of the external device 102 may control antenna setting including an on/off control of each of the NFC antennas 401, 402, 403, and 404 or the NFC antennas 601, 602, 603, 604, 605, 606, 607, 608, and 609 according to the antenna setting information received from the electronic device 101, and may report the control result to the electronic device 101.

Therefore, the processor 120 or 310 of the electronic device 101 may perform an NFC function using the NFC antennas of the external device 102.

Methods disclosed in the claims and/or methods according to various embodiments described in the disclosure may be implemented by hardware, software, or a combination of hardware and software When the methods are implemented by software, a computer-readable storage medium for storing one or more programs (software modules) may be provided The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented example embodiments. However, the singular form or plural form is selected appropriately to the presented situation for the convenience of description, and the disclosure is not limited by elements expressed in the singular or the plural Therefore, either an element expressed in the plural may also include a single element or an element expressed in the singular may also include multiple elements.

While the disclosure has been illustrated and described with reference to various example embodiments thereof, it will be understood that the various example embodiments are intended to be illustrative, not limiting. It will be further understood by one of ordinary skill in the art that various changes in form and detail may be made without departing from the true spirit and full scope of the disclosure, including the appended claims and equivalents thereof.

What is claimed is:

1. An external electronic device comprising:
   a housing;
   a communication module comprising circuitry coupled to at least one surface of the housing and configured to be connected to an electronic device comprising multiple near field communication (NFC) antennas, wherein the multiple NFC antennas are disposed in the electronic device to overlap at least a portion of each other; and
   a sensor configured to sense coupling of the electronic device based the electronic device being coupled;
   a processor, wherein the processor is configured to:
   receive a sensing signal from the sensor,
   in response to receiving a sensing signal from the sensor, determine that the electronic device is coupled to the external electronic device,
   in response to determining that the electronic device is coupled to the external electronic device, transmit an authentication request to authenticate the electronic device, receive, from the electronic device, a response signal corresponding to the authentication request, obtain device information indicating a type of the electronic device based on the response signal received from the electronic device;

in case that the type of the electronic device corresponds to the external electronic device, generate antenna setting information for setting the multiple NFC antennas of the electronic device based on the device information of the electronic device and device information of the external electronic device; and control the external electronic device to transmit the generated antenna setting information to the electronic device to activate at least one of the multiple NFC antennas and deactivate the other NFC antenna(s) of the multiple NFC antennas, performing NFC communication through the at least one activated NFC antenna of the electronic device based on the generated antenna setting information.

2. The external electronic device of claim 1, wherein the device information of the electronic device comprises at least one of a product name, a model ID, or a model number of the electronic device.

3. The external electronic device of claim 1, further comprising
a memory configured to store antenna information applicable to performing an NFC function of the external electronic device based on the device information of the external electronic device,
wherein the processor is configured to generate the antenna setting information based on the antenna information.

4. The external electronic device of claim 3, wherein the antenna information comprises at least one of a position, a size, or an antenna number of each of the multiple NFC antennas of the electronic device.

5. The external electronic device of claim 1, further comprising
a memory configured to store information on the multiple NFC antennas of the electronic device based on the device information of the external device,
wherein the processor is configured to generate the antenna setting information based on the antenna information.

6. The external electronic device of claim 1, wherein the processor is configured to: control the external electronic device to transmit a signal requesting device information of the electronic device to the electronic device; and obtain the device information of the electronic device based on a response signal corresponding to the signal.

7. A method of operating an external electronic device configured to be connected to an electronic device comprising multiple near field communication (NFC) antennas disposed in the electronic device to overlap at least a portion of each other, and providing an NFC function, the method comprising:

receiving a sensing signal from a sensor included in the external electronic device, in response to receiving the sensing signal, determining that the external device is coupled to the electronic device, in response to determining that the electronic device is coupled to the external electronic device, transmitting an authentication request to authenticate the electronic device, receiving, from the electronic device, a response signal corresponding to the authentication request, obtaining device information indicating a type of the electronic device based on the response signal, in case that the type of the electronic device corresponds to the external electronic device, generating antenna setting information for setting the multiple NFC antennas of the electronic device, based on at least one of the device information of the electronic device and device information of the external electronic device; and transmitting the generated antenna setting information to the electronic device to activate at least one of the multiple NFC antennas and deactivate the other NFC antenna(s) of the multiple NFC antennas, performing NFC communication through the at least one activated NFC antenna of the electronic device based on the generated antenna setting information.

8. The method of claim 7, wherein the device information of the electronic device comprises at least one of a product name, a model ID, or a model number of the electronic device.

9. The method of claim 7, further comprising:
obtaining antenna information applicable to performing an NFC function of the external electronic device based on the device information of the external electronic device; and
generating the antenna setting information using the antenna information.

10. The method of claim 9, wherein the antenna information comprises at least one of a position, a size, or an antenna number of each of the multiple NFC antennas of the electronic device.

11. The method of claim 7, further comprising:
obtaining information on the multiple NFC antennas of the electronic device based on the device information of the electronic device; and
generating the antenna setting information using the antenna information.

12. The method of claim 7, further comprising:
transmitting a signal requesting device information of the electronic device to the electronic device;
receiving a response signal corresponding to the signal; and
obtaining the device information of the electronic device from the response signal.

* * * * *